(12) United States Patent
Chenowth

(10) Patent No.: US 8,336,947 B2
(45) Date of Patent: Dec. 25, 2012

(54) DUST-PROOF END CLOSURE FOR CONTRACTIBLE CANOPY

(76) Inventor: Lynn Chenowth, Rodeo, NM (US)

( * ) Notice: Subject to any disclaimer, the term of this patent is extended or adjusted under 35 U.S.C. 154(b) by 241 days.

(21) Appl. No.: 12/663,105

(22) PCT Filed: Jun. 5, 2008

(86) PCT No.: PCT/US2008/007075
§ 371 (c)(1),
(2), (4) Date: May 25, 2010

(87) PCT Pub. No.: WO2008/153901
PCT Pub. Date: Dec. 18, 2008

(65) Prior Publication Data
US 2010/0276963 A1 Nov. 4, 2010

Related U.S. Application Data

(63) Continuation of application No. 11/758,626, filed on Jun. 5, 2007, now Pat. No. 7,510,230.

(51) Int. Cl.
*B60P 7/02* (2006.01)
(52) U.S. Cl. .................................. 296/100.16
(58) Field of Classification Search ............. 296/100.01, 296/101, 100.06, 100.07, 100.08, 100.1, 296/100.11, 100.12, 100.13, 100.16
See application file for complete search history.

(56) References Cited

U.S. PATENT DOCUMENTS

| | | | | |
|---|---|---|---|---|
| 3,820,840 | A | * | 6/1974 | Forsberg ................. 296/100.12 |
| 4,252,363 | A | * | 2/1981 | Rodrigue ................ 296/100.12 |
| 4,285,539 | A | * | 8/1981 | Cole ............................ 296/105 |
| 4,740,029 | A | * | 4/1988 | Tuerk ...................... 296/100.15 |
| 4,948,193 | A | * | 8/1990 | Weaver .................... 296/100.11 |
| 5,112,097 | A | * | 5/1992 | Turner, Jr. ............... 296/100.12 |
| 5,524,953 | A | * | 6/1996 | Shaer ...................... 296/100.12 |
| 5,938,270 | A | * | 8/1999 | Swanson et al. ........ 296/100.11 |
| 6,007,138 | A | * | 12/1999 | Cramaro ................. 296/100.11 |
| 6,142,554 | A | * | 11/2000 | Carroll et al. ........... 296/100.12 |
| 7,510,230 | B2 | * | 3/2009 | Chenowth ............... 296/100.16 |
| 2005/0151390 | A1 | * | 7/2005 | Schmeichel et al. ..... 296/100.16 |

* cited by examiner

*Primary Examiner* — H Gutman
(74) *Attorney, Agent, or Firm* — Charmasson, Buchao & Leach, LLP

(57) ABSTRACT

A foldable canopy cover (13) can be automatically extended over the open top (11) of a container (12). The canopy is supported by a series of arcuate booms (14) transversally spanning the top of the container. Each boom is secured at opposite ends to a pair of train members riding on rails (16, 17) running along the lateral upper edges of the container. At the end of the covering movement, as the leading edge (27) of the canopy approaches the end (32) of the container, it is brought down flush with the container rim by contact between a cam ramp (37) associated with the container and a roller pin (35) on a lever (30) supporting the leading edge of the canopy, in order to tightly close the open top.

21 Claims, 3 Drawing Sheets

DUST-PROOF END CLOSURE FOR CONTRACTIBLE CANOPY

This application is a 371 of PCT/US2008/007075 filed Jun. 05, 2008 which is a continuation of U.S. patent application Ser. No. 11/758,626, filed Jun. 05, 2007, now U.S. Pat. No. 7,510,230.

FIELD OF THE INVENTION

This invention relates to contractible canopies for truck beds, and more particularly to mechanisms for providing a tight closure of the canopy at the end of its deployment movement.

BACKGROUND

In many jurisdictions, the law requires that trucks and trailers used in the transport of various materials such as sand, gravel, grain, trash and other loose substances have a cargo area fully covered by a tarpaulin sheet or a net in order to prevent transported material from being blown away and causing driving hazards for following vehicles or from dumping litter on the highway.

Contractible canopies are usually rolled up or bundled up when not in use against the forward edge of a cargo area, then deployed on command until the leading edge of the canopy meets the trailing edge of the cargo compartment.

Because the framework holding the tarpaulin tends to ride a few centimeters above the top edges of the container, a gap may be left between the leading edge of the tarpaulin and the back of the cargo area. This gap can allow material to pass through and be dumped on the highway. The problem has been addressed in the prior art with rather complex and bulky mechanisms as disclosed in U.S. Pat. No. 4,740,029 Tuerk; Pat. No. 5,524,953 Shaer; and Pat. No. 6,007,138 Cramaro. These three patents are hereby incorporated herein by this reference into this specification. The multiplicity of levers, pulleys, push-rods, and articulations in the embodiments of the prior art increase the chances of failure and require frequent maintenance, especially if the vehicle, as is often the case, operates in a very dusty environment.

The instant invention results from an attempt to provide a simple, foolproof and dust-proof closure at the back edge of a contractible canopy covering a container.

SUMMARY

A contractible canopy assembly for covering the open top of a quadrangular container comprises first and second rails parallelly installed along opposite sides of the open top, a plurality of train members slidingly mounted on each of said rails and being translatable therealong, including a leading pair of said train members movable toward a distal edge of the container, a plurality of booms spanning said top, each being secured at opposite ends of one of said train members, a pair of levers, each having a fulcrum point in a median section thereof and being rotatively attached about said fulcrum point to one of the leading train member about an horizontal axis, a leading one of said booms joining first locations on the levers, and means for rotating the levers and leading boom as said leading train members approach an extremity of the rails.

The means for rotating include a cam-ramp proximal to the extremity of a rail and a roller pin at a second location on at least one of the levers. The cam-ramp is sized and contoured to interact with the roller pins and to rotate the lever.

The ramp is preferably secured to a face of one of the rails.

The above assembly further comprises a pair of axles, each projecting horizontally from one of the rails and engaging one of the levers at its fulcrum point.

The means for rotating further comprise means for resiliently biasing the levers toward an upright position.

In the aforesaid assembly, the means for biasing comprise a spiral spring having an inner end fixedly attached on said axle and an outer end secured to the lever.

The cam-ramp comprises a median section obliquely oriented in relation to the rail and a distant section parallel to the rails.

The assembly further comprises a mortise-forming block at the distal edge of the container and a bolt associated with the leading train member and lever, and being positioned to engage the mortise-forming member when the roller pin contacts the distal section of the cam-ramp.

The assembly further comprises means for adjusting the tension of said spring.

The means for adjusting comprise a plurality of locations for securing outer end of the spring to the lever.

DESCRIPTION OF THE EXEMPLARY EMBODIMENTS

Figure 1:
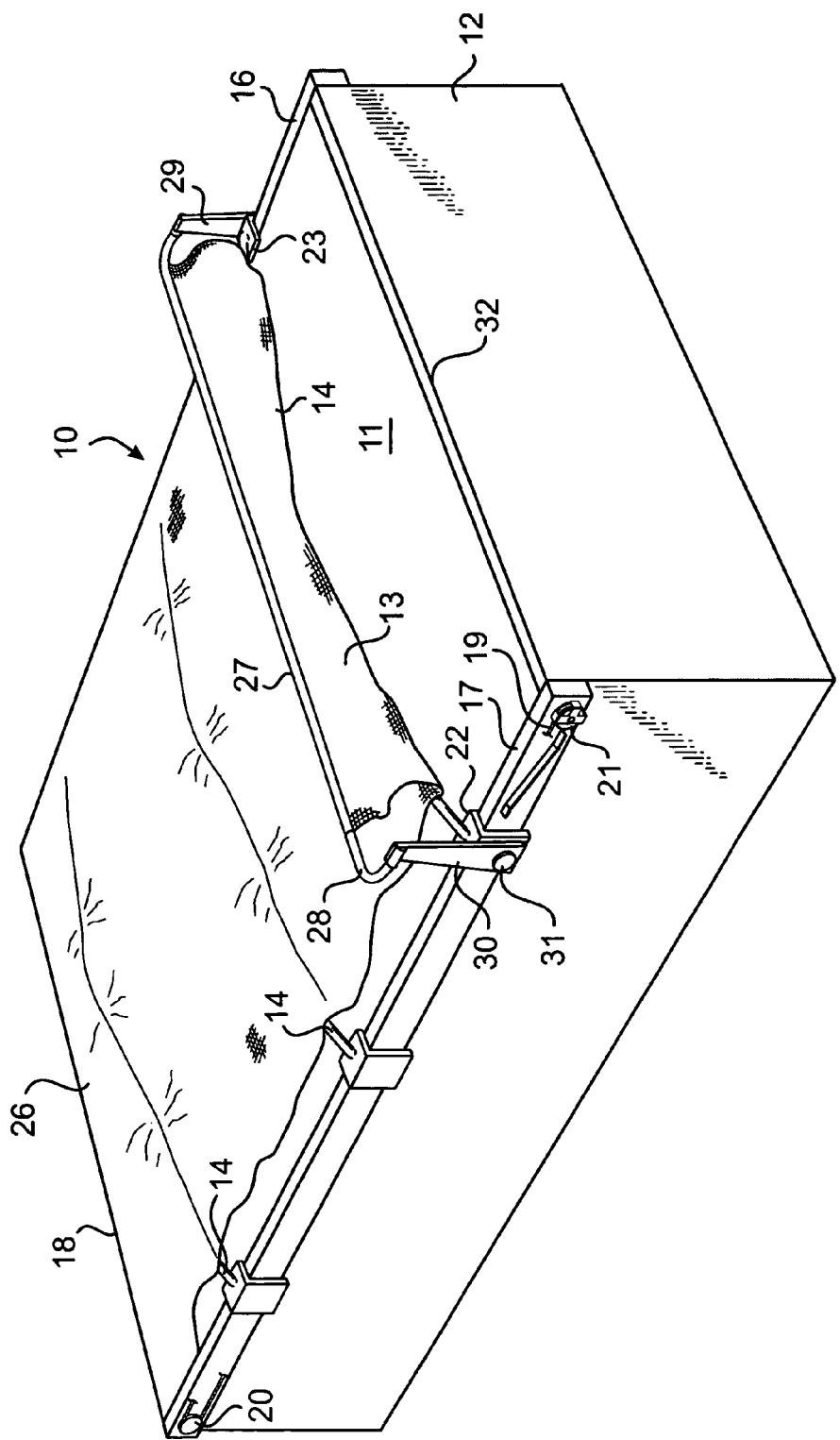
FIG. 1 is a perspective view of a contractible canopy according to the invention.

Referring now to the drawing, there is shown in FIG. 1, a contractible canopy 10 according to the invention being deployed over the open top 11 of a container 12. It should be understood that the container could constitute the cargo area of a truck, trailer or other vehicle.

The canopy comprises a tarpaulin 13 supported by a series of arcuate booms 14 spanning the open top transversally. Each boom is supported at opposite ends by a pair of train members 15 slidingly mounted on a pair of rails 16, 17 so that the train members and associated booms can be translated back and forth along the rails.

In its contracted state, the canopy is bunched up against one of the extremities 18 of the container 12. If the container constitutes the cargo area of a truck or trailer, that extremity 18 would preferably be the forward part of the container.

A cable 19 on each side of the assembly runs between two pulleys 20, 21 and is captured by the leading train members 22, 23; that is the most rearward located in the case of a truck container. It should be understood that the cable and pulleys could be equivalently replaced by a chain and gear assembly as disclosed in U.S. Pat. No. 5,112,097 Turner, Jr., which patent is hereby incorporated herein by this reference into this specification. The pulleys are synchronously driven in either direction by a motor in a manner disclosed in the prior art. The rails 16, 17 are parallelly installed against the lateral upper edges 24, 25 of the container or otherwise formed onto the container such as by being formed integrally with the lateral edges themselves. The back edge 26 of the tarpaulin is preferably permanently attached to the forward extremity 18 of the container. The leading edge 27 is attached to a leading boom 28. That boom is secured at opposite ends to a pair of levers 29, 30. Each lever is rotatively connected at a fulcrum point 31 to one of the leading train members 22, 23 about an horizontal axis.

Figure 2:
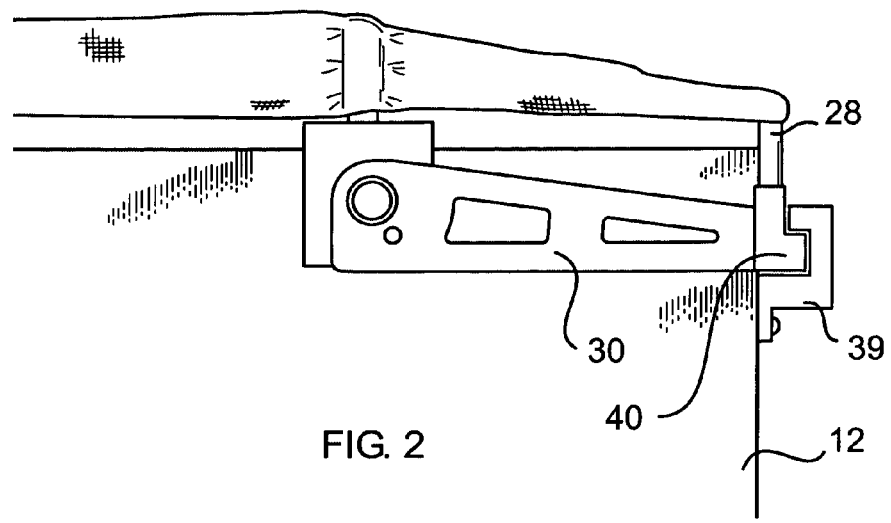
FIG. 2 is a diagrammatical side view of the closed end of said canopy.
Figure 4:
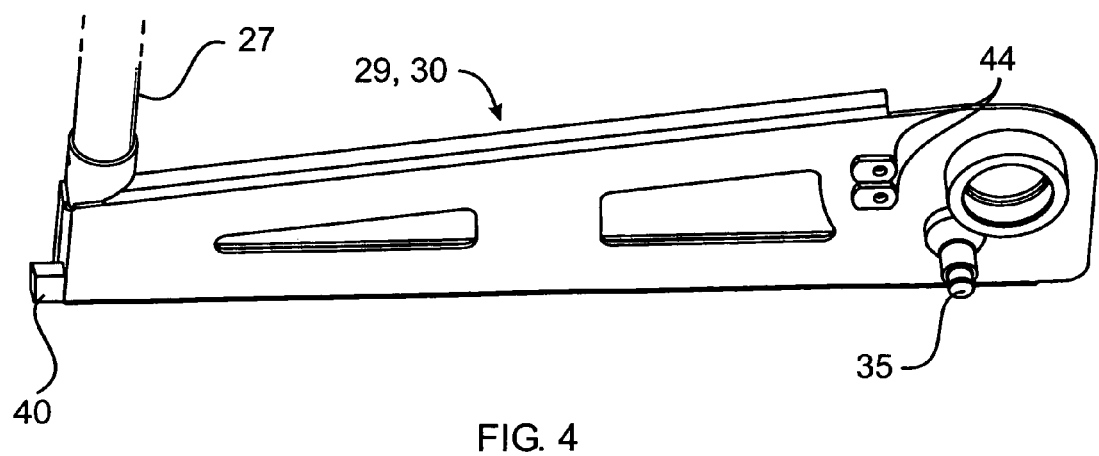
FIG. 4 is a perspective view of the end closure lever.
Figure 3:
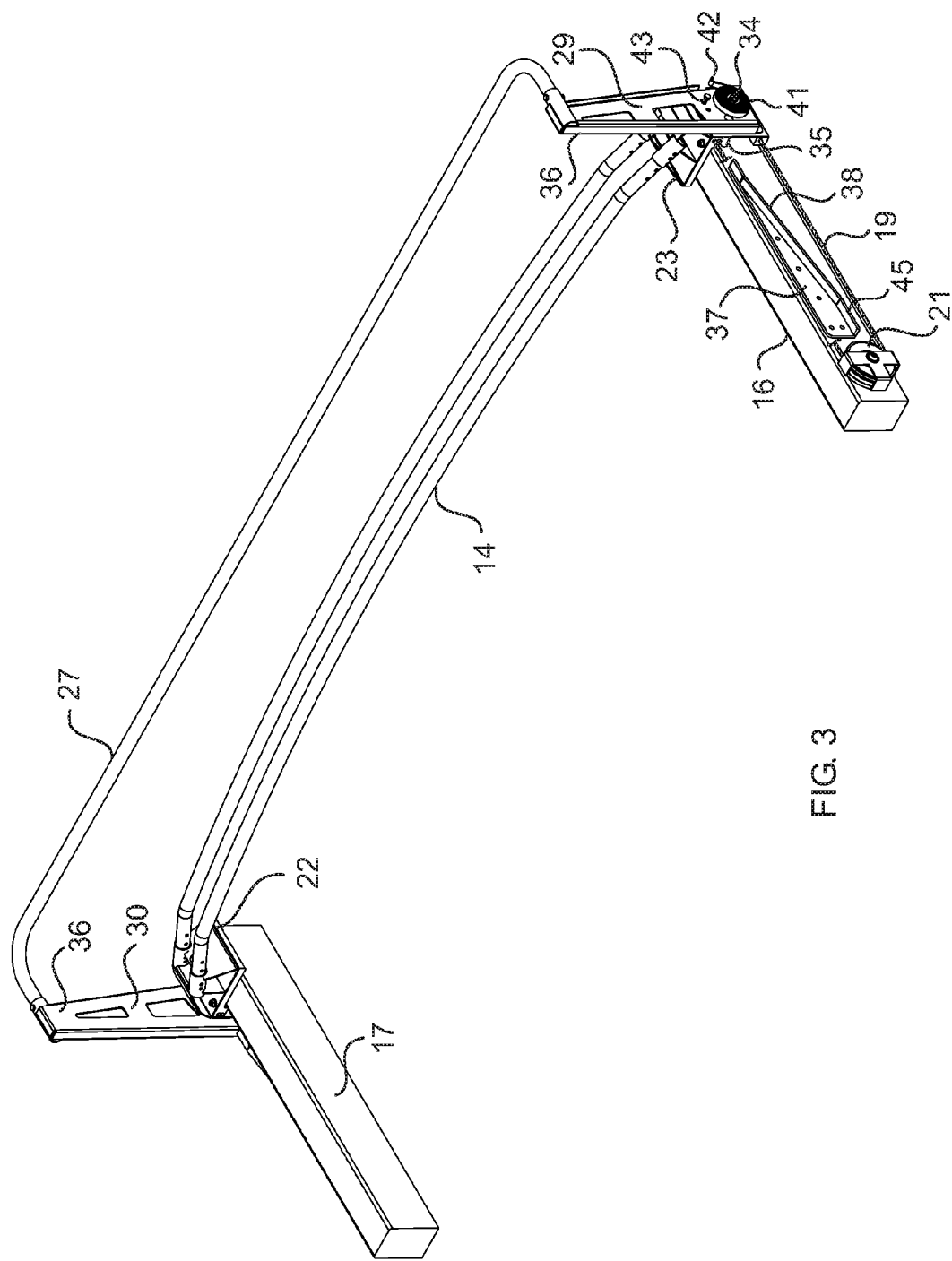
FIG. 3 is a perspective view of the end closure mechanism.

As the trailing train members approach the back upper edge 32 at the extremity of the container near the end of the canopy deployment procedure, the levers 29, 30 are rotated about 90 degrees to bring the leading edge 27 of the canopy and leading boom 28 into intimate contact with the back edge 32 of the container as illustrated in FIG. 2. The shape and dimensions of the leading boom 28 are designed to matingly match the outline of the back upper edge 32 of the container. The rotating movement of the lever is imposed by a roller pin and cam mechanism as further described below.

Each lever 29, 30 is rotatively mounted to its corresponding train member, at its fulcrum point, on an axle 34 projecting horizontally from the outer face of, and perpendicular to the corresponding rail 16, 17. A roller pin 35 projects from the inner face 36 of the lever and, as the leading train members 22, 23 and levers approach the end of the rails and the extremity of the container, comes into contact with a cam-ramp 37. The cam-ramp has a median section 38 which is oblique in relation to the orientation of the rails, that is sloping downward toward the extremity of the container, and a distal section 39 which runs parallel to the rails. As the roller pin 35 comes in contact with the under surface of the oblique section 45 of the cam-ramp, it is guided downward and the levers are forced into rotation until they reach the closed position illustrated in FIG. 2.

As further illustrated in FIG. 2, a mortise-forming member 39 is mounted at the extremity of the container 12 and is engaged by a bolt 40 formed near the junction of the lever and leading boom 27.

In order to keep the levers upright during the canopy deployment procedure, a spiral spring biasing element 41 having its inner end fixedly attached to the axle 34 and its outer end 42 secured to a screw pin 43, biases the lever toward that position. A plurality of threaded bores 44 are provided to mount the screw pin 43 at different radial positions in relation to the axle 34 in order to provide an adjustment mechanism as a convenient means to adjust the tension of the spring by changing the position of the screw pin 42.

The movement of the bolt 40 into the mortise-forming member 39 is guided by the distal section 45 of the cam-ramp which is parallel to the rails.

While the preferred embodiment of the invention has been described, modifications can be made and other embodiments may be devised without departing from the spirit of the invention and the scope of the appended claims.

What is claimed is:

1. In a contractible canopy assembly having a tarpauline carried by a plurality of booms translatably mounted upon at least one rail, an improvement for rotating at least one of said booms at a specified location on said rail, said improvement comprises:
   a first one of said booms being secured to a lever rotatively attached at a fulcrum point to a train member translatively mounted to said rail;
   wherein said lever comprises a projection spaced apart from said fulcrum point;
   at least one cam ramp located along said rail; and,
   said cam ramp being sized and contoured to interact with said projection to rotate said lever.

2. The improvement of claim 1, wherein said ramp is secured to a face of said rail.

3. The improvement of claim 1, which further comprises a biasing element resiliently biasing said lever toward a first rotational position.

4. The improvement of claim 1, which further comprises:
   an axle projecting perpendicular to said rail from said train member and engaging said lever at said fulcrum point; and,
   wherein said biasing element comprises a spiral spring having an inner end fixedly attached on said axle and an outer end secured to said first lever.

5. The improvement of claim 4, which further comprises an adjustment mechanism for adjusting the tension of said spring.

6. The improvement of claim 5, wherein said adjustment mechanism comprises a plurality of locations for securing said outer end to said lever.

7. The improvement of claim 1, wherein said projection comprises a roller oriented to rollingly engage said cam ramp.

8. The improvement of claim 1, wherein said rail is formed on a lateral upper edge of an open-topped cargo container.

9. The improvement of claim 1, wherein said cam ramp comprises a median section obliquely oriented in relation to said rail and a distant section parallel to said rail.

10. The improvement of claim 9, which further comprises a mortise-forming block at a distal edge of said container; and
    a bolt associated with said train member and lever, said bolt being positioned to engage said mortise-forming block when said projection reaches said distant section.

11. A contractible canopy assembly for covering the open top of a quadrangular container which comprises:
    first and second rails parallelly formed along opposite sides of said open top;
    a plurality of train members slidingly mounted on each of said rails and being translatable therealong, including a leading pair of said train members;
    a plurality of booms spanning said top, each being secured at opposite ends to one of said train members;
    a first lever, having a fulcrum point at a first location thereof and being rotatively attached at said fulcrum point to a first one of said leading pair;
    a leading one of said booms secured to said lever;
    a tarpaulin attached at spaced-apart intervals to said booms;
    at least one cam ramp proximal to an extremity of said rails; and
    a projection at a second location of said lever, said cam ramp being sized and contoured to interact with said projection and to rotate said lever.

12. The assembly of claim 11, which further comprises a second lever, having a second fulcrum point at a second location, said second lever being rotatively attached at said second fulcrum point to a second one of said leading pair.

13. The assembly of claim 11, wherein said ramp is secured to a face of one of said rails.

14. The assembly of claim 11, which further comprises an axle projecting horizontally from one of said leading pair and engaging said first levers at said first fulcrum point.

15. The assembly of claim 14, which further comprises a biasing element resiliently biasing said first lever toward a first rotational position.

16. The assembly of claim 15, wherein said biasing element comprises a spiral spring having an inner end fixedly attached on said axle and an outer end secured to said first lever.

17. The assembly of claim 16, which further comprises an adjustment mechanism for adjusting a tension of said spring.

18. The assembly of claim 17, wherein said adjustment mechanism comprises a plurality of locations for securing said outer end to said first lever.

19. The assembly of claim 11, wherein said cam ramp comprises a median section obliquely oriented in relation to said rails and a distant section parallel to said rails.

20. The assembly of claim 19, which further comprises a mortise-forming block at a distal edge of said container; and
   a bolt associated with one of said leading pair and said levers, said bolt being positioned to engage said mortise-forming block when said projection reaches said distant section.

21. A mechanism for retractably deploying a contractible canopy along a rail, said mechanism comprises:
   a tarpauline;
   at least one boom attached to said tarpauline;
   at least one train member slidingly mounted to said rail;
   at least one lever rotatively attached at a fulcrum point to said at least one train member;
   wherein said at least one lever comprises:
      an end spaced apart from said fulcrum point, connected to said at least one boom;
      a projection spaced apart from said fulcrum point;
   at least one cam ramp located along said rail;
   said cam ramp being sized and contoured to interact with said projection to rotate said at least one lever.

* * * * *